United States Patent Office 3,346,463
Patented Oct. 10, 1967

3,346,463
STABILIZATION AND ENHANCEMENT OF THE ACTIVITY OF FLOCCULANTS
Mayer B. Goren, Golden, Colo., assignor to Kerr-McGee Corporation, a corporation of Delaware
No Drawing. Filed Sept. 10, 1964, Ser. No. 395,583
16 Claims. (Cl. 195—31)

This invention broadly relates to microbial polysaccharides which are useful as flocculating agents for finely divided solids suspended in aqueous media. In one of its more specific aspects, the invention relates to a novel process for stabilizing and/or enhancing the flocculating activity of microbial polysaccharides.

Flocculating agents find use in a large number of applications in industry, such as in the flocculation of suspended slimes from aqueous solutions resulting from the beneficiation by hydrometallurgical processes of uranium, potash, aluminum, and Florida phosphate ores. A large number of natural and synthetic materials are used at present for this purpose. Examples of natural materials include agar, guar gum, glue, gelatin, starch, and modified cellulose derivatives, while examples of synthetic materials include polyacrylamides, polyacrylic acid and polyvinyl pyrrolidone. Other materials may be prepared or synthesized by microorganisms such as the dextran described in United States Patent No. 3,085,853 to Lesinski et al. for use in processing bauxite ore. However, the dextran described in the Lesinski et al. patent has a very low flocculating activity and it is usually considered to be unsatisfactory for use as a general flocculating agent in treating slime-containing hydrometallurgical leach liquors on a commercial scale.

Still other microbial flocculating agents are disclosed in copending application Ser. No. 383,978, filed July 20, 1964, and now abandoned, by James E. Zajic and Mayer B. Goren, for Flocculant Production and the Resultant Product. While the polysaccharide flocculating agents disclosed in this copending application are far superior to any microbial polysaccharide flocculants known heretofore, nevertheless it has been discovered that the flocculating activity of certain of the polysaccharides may be enhanced by treatment in accordance with the process of the present invention. It has been further discovered that certain of the microbial flocculants may be stabilized against degradation and thereby assure a long storage life.

It is an object of the present invention to provide a novel process for enhancing the flocculating activity of certain microbial polysaccharide flocculants.

It is a further object to provide a novel process for stabilizing certain microbial polysaccharide flocculants against degradation upon storage.

It is still a further object to provide novel polysaccharide flocculants of increased or enhanced flocculating activity which are produced by the process of the invention.

Still other objects and advantages of the invention will be apparent to those skilled in the art upon reference to the following detailed description and the examples.

The microbial polysaccharide flocculants to be enhanced in activity in accordance with the process of the invention may be synthesized by cultivating one or more of the microorganisms *Cryptococcus laurentii* variety *flavescens, Hansenula capsulata, Hansenula holstii, Plectania occidentalis* and *Pseudomonas methanica* in a fermentation medium therefor. The microbes may be cultivated by known fermentation procedures to synthesize polysaccharide flocculants which are useful as raw materials in practicing the present invention.

The fermentation medium may contain the usual substances which are known to be necessary for the growth and cultivation of the selected microbes to synthesize the polysaccharide flocculant raw material. Certain microbes may require known specific ingredients when grown in aqueous fermentation media, while others will grow on a variety of substrates. The source of carbon for growth may be a suitable carbon-containing material readily assimilable by the microorganism and in many instances may include normally gaseous hydrocarbons such as methane, and alcohol such as methanol, or a carbohydrate such as dextrose, sucrose, maltose, fructose, black strap molasses, cane syrup or sugar, beet sugar, wood sugar or sugars derived by hydrolysis of wood or wood products, starch or starch products.

The nitrogen requirements may be supplied by one or more suitable nitrogen-containing substances which contain nitrogen readily assimilable by the specific microorganisms such as water soluble metal nitrates, urea, ammonium salts, amino acids, proteins or atmospheric nitrogen in some instances. Usually the nitrogen-containing substance should be present in the aqueous fermentation mixture in an amount of about 0.01–1% by weight. About 0.05–0.40% by weight of a monobasic and dibasic water soluble metal phosphate may be added to the fermentation medium to buffer the system at the desired pH and to supply required phosphate. Also, about 0.01–0.40% by weight of a water soluble metal sulfate may be added and preferably manganese sulfate, as it supplies an important divalent cation which is often desirable for adequate rates of growth. A second divalent metal ion may me added in an amount of about 0.01–0.40% by weight in the form of a water soluble magnesium salt such as the chloride.

Still other nutrients may be present in the aqueous fermentation medium. For instance, microbial systems grow much more rapidly in the presence of about 0.0001–0.05% by weight of yeast extract, beef extract, casein hydrolysate or peptones, and one or more of these substances may be added to supplement the fermentation medium and especially when small amounts of vitamins or amino acids are required for rapid growth.

One specific fermentation medium which is especially useful in the cultivation of *Pseudomonas methanica* may contain by weight 100 grams of water, 0.2% sodium nitrate, 0.02% magnesium sulfate, 0.01% ferrous sulfate, 0.21% dibasic potassium phosphate, 0.009% monobasic potassium phosphate, 0.004% sodium chloride, 0.0015% calcium chloride, 1.0 microgram of manganous sulfate, 7.0% micrograms of zinc sulfate, 1.0 microgram of molybdic acid, 5.0 micrograms of copper sulfate and 1.0 microgram of boric acid. About 0.005–0.4% of agar may be added, or an equivalent amount of agar extract or agar hydrolysate in order to increase the synthesis and activity of the polysaccharide flocculant. The fermentation of *Pseudomonas methanica* is conducted in the presence of methane and elemental oxygen. The methane serves as the only convenient source of assimilable carbon for growth of the microorganism.

The fermentations may be conducted over a temperature range of about 15–40° C. and usually fermentation temperatures of about 23–33° C. are preferred. The microbe may be cultivated by general fermentative procedures well known in the art. For instance, laboratory scale fermentations may be conducted in 500 milliliter Erlenmeyer flasks and larger scale fermentations may be conducted in any suitable type or size of fermentation vessel.

If desired, the fermentations may be conveniently conducted by adding the liquid fermentation medium to the fermentation vessel. The vessel and fermentation medium are sterilized and inoculated with liquid inoculum containing the desired microbes in a logarithmic stage of growth, and then the microbes are cultivated under the optimum temperature, pH and agitation and nutrient conditions for growth and flocculant synthesis. An initial pH value for the fermentation medium of about 7.0–7.5 is optimum for the growth of most of the microbes, but some grow rapidly over a wide pH range such as about 4.0–8.5. The pH of the fermentation medium may be adjusted before and/or periodically during the fermentation to an optimum level for flocculant production by addition of a base such as sodium hydroxide or an acid such as hydrochloric acid.

Better results are often obtained when the fermentation medium is aerated. In such instances, rotary shakers or other means for agitating and/or aerating the fermentation medium may be employed. In instances where the fermentation is highly aerobic, it may be advantageous to increase the rate of agitation and/or aeration as the fermentation proceeds and especially where the fermentation medium thickens due to the biosynthesis of mucoid polysaccharide material.

The fermentation time for polysaccharide flocculant production may vary over a wide range such as from about 24 hours to about 14 days. A fermentation time of about 3 to 8 days is preferred for most of the microbes, and in some instances from about 3 to 5 days. It is only necessary that the fermentation be conducted for a sufficient period of time to result in synthesis of the polysaccharide flocculant, and then be terminated before degradation of the product commences or has reached a detrimental stage.

The fermentations may be conducted by batch, semicontinuous or continuous processes. The fermentations are especially adaptable to continuous operation, and rapid conversion of substrate into high yields of polysaccharide product is possible to thereby achieve good yields in short fermentation periods. If desired, the nutrients for the growth of the microorganisms may be added to the fermentation medium in increments as the fermentation proceeds.

Upon termination of the fermentation, the polysaccharide flocculant may be recovered and purified in instances where this is desirable. The purification may be carried out by diluting the fermentation broth with water, adjusting the pH to about 3.5–7.5, and adding methyl or ethyl alcohol in a quantity sufficient to precipitate the polysaccharide substantially quantitatively. Dilution with about an equal volume of water and use of about one to three volumes of alcohol have been found to be satisfactory, and a pH of about 5.0–5.5 usually gives optimum results. The precipitated polysaccharide flocculant may be separated from the fermentation medium by filtration or centrifuging, and if desired it may be further purified by redissolving in water and repeating the precipitation and recovery steps.

In instances were impurities in the raw fermentation broth are not disadvantageous, the entire fermentation broth which contains the unpurified polysaccharide flocculant may be used as the flocculating agent. This procedure usually preferred in instances where slimes in hydrometallurgical leach liquors are to be flocculated near the site of the fermentation. In such instances, unpurified fermentation broth may be added to the suspension of solids to be flocculated in its concentrated or undiluted form, or it may be diluted with water or other aqueous media and then added.

If the fermentation must be carried out at a substantial distance from the place of use of the flocculant, the polysaccharide product may be precipitated as described above, filtered or centrifuged to remove excess water and then dried. Drum driers, spray drying, or lyophilization may be used, but drying processes involving temperatures above about 90° C. should be avoided as high temperatures often degrade the product. The dried product may be conveniently transported to the place of use and then dissolved in water and used as a flocculant.

Due to the unexpected lability of the flocculant product, it is desirable to stabilize it after the fermentation is completed. A solution in water of the polysaccharide flocculant prepared as discussed above, and which may be either the crude fermentation broth or precipitated polysaccharide which has been separated from the fermentation broth and redissolved in water, may be stabilized against degradation by heating at about 50–100° C. The period of heating at a given temperature may vary between a few seconds and about one hour but it should not be for a sufficient period of time to degrade the flocculant markedly. For better results, the final pH of the fermentation broth is adjusted to about 5–8 and in such cases the broth is heated. The optimum pH for stabilization or storage is about 5.0–5.5, and the temperature of storage should be below 40° C. A good practical storage temperature in many instances is about 15–25° C., but often storage temperatures as low as freezing or below are very satisfactory. For some uses the flocculant product may be exposed to temperatures up to 100° C. and the addition of caustic to adjust pH is essential in stabilizing the flocculant activity.

It is also possible to increase the stability by adding certain diluents. Dilution of the concentrated fermentation broth to about 1:10 to 1:200 with an aqueous medium such as water or saturated potash brine gives excellent storage properties. Storage in potash brine is very convenient and practical if the flocculant product is to be used in a hydrometallurgical process in which potash is being recovered.

In enhancing the flocculating activity of the polysaccharide flocculant, the raw fermentation broth or purified polysaccharide product after being dissolved in water, is adjusted in pH to a value greater than 5, and preferably greater than 8, and the solution is heated until the flocculating activity is increased. Preferably, the solution is heated for a period of time sufficient to cause an increase in viscosity. Better results are usually obtained when the pH value is adjusted to about 8–10, and best results when the pH value is about 9. The period of heating will vary substantially in given instances, but heating at about 50–100° C. over a period varying from a few seconds to approximately 1–2 hours will be sufficient. Usually a period of heating of about 5–30 minutes at 75–100° C. gives very acceptable results without appreciable degradation of product, and a heating period of about 15 minutes at approximately 90–100° C. is preferred.

In adjusting the pH of the polysaccharide solution, acids which may be employed in instances where the solution is initially too basic include mineral acids such as hydrochloric and sulphuric. Hydrochloric acid is usually preferred. In instances where the polysaccharide solution is initially too acid, bases which may be used in adjusting the pH include sodium, potassium and ammonium hydroxides. It is understood that satisfactory acids and bases other than those specifically mentioned may be employed.

The process of the present invention for enhancing the activity of the flocculant also has a favorable effect on stabilization. Only a few microorganisms synthesize polysaccharide products which are improved by the process described herein. In almost every instance, pH adjustment followed by heating will not result in enhancement of flocculating activity and stabilization of the polysaccharide product. In most instances there is either no effect or there is actually degradation and the resultant flocculant is even less desirable than before. Therefore, the polysaccharide products produced by the five microorganisms described herein are unique in that they are improved by the pH adjustment and heating steps rather than degraded.

In flocculating finely divided solids suspended in aqueous media, after enchancing the activity of the flocculant a small but effective amount of either the fermentation medium containing the unpurified polysaccharide flocculant or an aqueous solution of the purified or dried polysaccharide flocculant may be added to the aqueous medium. It is usually preferred that very dilute solutions of the flocculating material be added but the concentration of the polysaccharide material after enhancement of the flocculating activity is not critical and may be varied over any practical range to achieve acceptable results.

The solution of enhanced polysaccharide flocculant may be added to the suspension of solids to be flocculated following any satisfactory prior art process. In many instances, it is desirable that the polysaccharide solution be added in increments so as to achieve optimum utilization of the active components. The addition should be made in a manner so as to assure good dispersion without violent agitation since this seems to aid in the growth of the floccules and their rapid settling. Usually it is preferred that the treated aqueous media be allowed to settle and thereby cause the flocculated solids to separate at least to some extent prior to decanting of clarified liquid or a filtration step to remove the flocculated solids.

The polysaccharide flocculants are effective over a wide pH range, flocculating solids suspended in neutral, strongly acidic and strongly basic media. They are particularly effective at pH 6.5–7.5. The amount of polysaccharide flocculant to be added will depend to some extent on the concentration of suspended solids and may vary over wide ranges. It is only necessary that an amount be added sufficient to effect a desired degree of flocculation and clarification. Usually, addition of the quantity of polysaccharide contained in about 0.01–10 ml. of raw undiluted fermentation broth for each gram of suspended solids to be flocculated is sufficient.

The polysaccharide flocculants of the present invention are especially useful in flocculating finely divided solids suspended in hydrometallurgical liquors derived by treating potash ore, uranium ore and Florida phosphate ore with aqueous media. Clay slimes present in liquors derived by leaching Carlsbad potash ore with a potassium chloride-sodium chloride brine are readily flocculated by addition of an effective amount of the polysaccharide.

The polysaccharides of enhanced flocculating activity produced in accordance with the present invention differ markedly from the dextran produced by certain other microorganisms. The differences are especially pronounced in the degree of flocculating activity exhibited by the polysaccharide flocculant produced in acordance with the present invention and the materials employed in prior art flocculating processes. These differences seem to extend to the chemical composition of the polysaccharide per se. For instance, the dextrans of the prior art are simply polymers of glucose, whereas the polysaccharides of the present invention consistently contain substantial amounts of other monosaccharides. Monosaccharides that have been identified as monomeric constituents in the microbial polysaccharides of the invention include glucose and, in addition thereto, galactose and mannose along with their respective hexuronic acids, i.e., glucuronic, galacturonic and mannuronic acids. Other constituents which have been identified are fucose, fructose, pyruvic acid and malonic acid.

The foregoing detailed description and the following specific examples are for purposes of illustration only, and are not intended as being limiting to the spirit or scope of the appended claims.

Example I

This example illustrates the enhancement of the flocculating activity of polysaccharides synthesized by several microorganisms.

The polysaccharides employed in this example were synthesized by the microorganisms listed below. The polysaccharides were purified by diluting the fermentation broth with an equal volume of water, adjusting the pH to 5.0–5.5 and precipitating the product by addition of an equal volume of methyl alcohol. The precipitated polysaccharide was recovered, dried, and then used in this example.

Solutions were made up which contained 0.1% by weight of one of the purified polysaccharides in water. Five milliliter aliquots of the aqueous solutions containing 0.1% by weight of a purified polysaccharide were treated with 0.1 milliliter portions of 1 N, 2 N, 3 N, and 4 N sodium hydroxide solutions and then heated at 100° C. for 15 minutes. The flocculating activity of the treated polysaccharide was tested on a suspension containing 1% by weight of finely divided clay slimes in potash brine. The resultant suspension of slimes was equivalent to a hydrometallurgical leach liquor produced by leaching of Carlsbad potash ores.

The polysaccharide solutions were tested for flocculating activity by adding a 10 milliliter portion of each treated 0.1% by weight polysaccharide solution to a 100 milliliter graduated cylinder containing 100 milliliters of the suspension of clay slimes in potash brine. The flocculating activity was determined by measuring the time required for the flocculated slime particles to fall 10 units (milliliter graduations) in the graduated cylinder in the initial free fall zone, i.e., before compaction occurred. A control containing untreated flocculant was tested to give comparative data. The data thus obtained are recorded below:

| Microbe Used in Synthesizing the Polysaccharide | Flocculation Time (minutes and seconds) for 10 Unit Drop in Free Fall Zone 0.1 ml. Caustic per 5.0 ml. Flocculant (Polysaccharide) | | | | |
|---|---|---|---|---|---|
| | Control Untreated | 1.0 N NaOH | 2.0 N NaOH | 3.0 N NaOH | 4.0 N NaOH |
| *Cryptococcus laurentii* var. *flavescens* | 12′25″ | 2′14″ | 2′27″ | 4′23″ | 3′38″ |
| *Hansenula holstii* Y-2154 | 27′20″ | 5′51″ | 7′50″ | 12′14″ | |
| *Plectania occidentalis* NRRL-349 | 47″ | 4″ | 9″ | 19″ | |

As shown by the above data, the flocculating activity was enhanced when the polysaccharide solutions were treated with base followed by heating.

Example II

This example illustrates the synthesis of a polysaccharide flocculant by *Pseudomonas methanica*.

The fermentation medium employed in this example contained the following weight ratio of ingredients: 100 milliliters of water, 0.2% of sodium nitrate, 0.02% of magnesium sulfate, 0.01% of ferrous sulfate, 0.21% of dibasic potassium phosphate, 0.009% of monobasic potassium phosphate, 0.004% of sodium chloride, 0.0015% of calcium chloride, 1.0 microgram of manganous sulfate, 7.0 micrograms of zinc sulfate, 1.0 microgram of molybdic acid, 5.0 micrograms of copper sulfate and 1.0 microgram of boric acid. The fermentation medium was adjusted to a pH value of 7.5.

One hundred milliliter portions of the fermentation medium were placed in 500 milliliter flasks and the mouth of each of the flasks was covered with a 0.5–1.0 centimeter layer of cotton and gauze. The flasks and the contents were sterilized in an autoclave at about 120° C. for approximately 30 minutes. After cooling, the flasks were inoculated with *Pseudomonas methanica* and placed in an enclosed environmental shaker rotating at 200 revolutions per minute. A gaseous mixture containing 60% methane and 40% elemental oxygen was supplied to the environmental shaker to assure that the agitated fermentation mixture contained dissolved methane and oxygen. The fermentation was allowed to proceed under the above conditions for six days at a temperature of about 30° C. and then the fermentation broth was used in the following examples.

Polysaccharide flocculants also could be synthesized by the process of this example when substituting the microorganism *Cryptococcus laurentii* variety *flavescens* or *Hansenula capsulata* for *Pseudomonas methanica*.

*Example III*

This example illustrates the enhancement of the flocculating activity of the polysaccharide synthesized by *Pseudomonas methanica* in accordance with Example II.

A 100 milliliter portion of crude fermentation broth prepared in accordance with Example II was treated with 2.0 milliliters of one normal aqueous sodium hydroxide and then heated at 100° C. for 120 minutes. The effect of pH adjustment and heating on the flocculating activity of the polysaccharide was determined by taking samples of the fermentation broth at selected time intervals and testing for flocculating activity following the general procedure outlined in Example I except as noted. In this example, 1.5 milliliters of the fermentation broth was withdrawn and added to a graduated cylinder containing 100 milliliters of the 1% potash slime. A control in which no fermentation broth was added was also tested to obtain comparative data. The data thus obtained are recorded below:

Boiling time at 100° C.:

| | Drop time required (minutes and seconds) to flocculate a 1% potash slime measured in a 100 ml. graduated cylinder from 100 to 50 ml. |
|---|---|
| Control—No flocculant | No settling |
| 0 | 22′25″ |
| 5 | 4′00″ |
| 10 | 3′49″ |
| 15 | 2′40″ |
| 20 | 2′51″ |
| 25 | 6′14″ |
| 30 | 10′53″ |
| 35 | 8′19″ |
| 40 | 11′54″ |
| 45 | 9′58″ |
| 50 | 10′29″ |
| 55 | 10′33″ |
| 60 | 9′58″ |
| 90 | 6′00″ |
| 120 | 8′48″ |

The above data show that the optimum time of heating is about 15 minutes at 100° C. at the adjusted pH level. However, heating for much shorter periods of time such as 5 minutes, or up to 2 hours, also resulted in a marked enhancement of the flocculating activity.

*Example IV*

This example illustrates the manner in which the optimum heating time varies with the strength of the added sodium hydroxide solution.

A 2.0 milliliter addition of aqueous sodium hydroxide solutions of varying strengths was made to 100 milliliter portions of a 6 day fermentation broth of *Pseudomonas methanica* prepared in accordance with Example II. The portions of fermentation broth were then heated in a boiling water bath for 4, 8, 12 and 16 minutes. The viscosity of the fermentation broth was observed to increase during the heating period.

The portions of fermentation broth treated as above were diluted with 10 volumes of potash brine, and 4.0 milliliters of each portion of the diluted broth was tested for flocculating activity following the general procedure of Example I. The time required for the 1% suspension of potash slimes to settle from the 100 milliliter mark to the 50 milliliter mark on the graduated cylinder was determined for each portion of fermentation broth. Also, a control run was made on untreated fermentation broth. The data thus obtained are recorded below:

| Heating Time at 100° C. (minutes) | Time Required (minutes and seconds) for a 1.0% Clay Slime to Fall from the 100 ml. to 50 ml. Marking of a 100 ml. Graduated Cylinder (Normality of Sodium Hydroxide) | | | |
|---|---|---|---|---|
| | 1 N | 2 N | 3 N | 4 N |
| 0 | 52:05 | 15:10 | 28:20 | 23:35 |
| 4 | 5:20 | 13:40 | 10:20 | 16:10 |
| 8 | 2:30 | 6:40 | 3:40 | 5:10 |
| 12 | 3:00 | 10:00 | 6:20 | 11:40 |
| 16 | 2:10 | 6:40 | 6:50 | 14:40 |

It may be seen from the above data that the optimum time for heating the fermentation broth varied somewhat with the concentration of the added sodium hydroxide. However, in all instances the flocculating activity was higher for the pH adjusted and heated fermentation broth than for the control.

*Example V*

This example illustrates the relationship between the pH of the fermentation broth during the heating step and the flocculating activity of the heated fermentation broth.

In this example, 5.0 milliliter portions of a fermentation broth containing a polysaccharide synthesized by the microorganism *Pseudomonas methanica* in accordance with the general procedure of Example II were adjusted in pH value over a range of 2.0 to 11.0 by addition of dilute hydrochloric acid or aqueous sodium hydroxide solution, as required. The resultant pH adjusted portions of fermentation broth were heated at 100° C. for 15 minutes and then diluted with 10 volumes of potash brine. The treated and diluted fermentation broth was tested for flocculating activity following the general procedure of Example I. The data thus obtained are recorded below:

| pH of Broth Adjusted With— | Adjusted pH of Broth | Time Required (minutes and seconds) for a 1.0% Slime to Fall from the 100 ml the 50 ml. Marking of a 100 ml. Graduated Cylinder |
|---|---|---|
| 1.2 ml., .5 N HCl | 2.0 | 60′ |
| 0.71 ml., .5 N HCl | 3.0 | 60′ |
| 0.63 ml., .5 N HCl | 4.0 | 58′35″ |
| 0.57 ml., .5 N HCl | 5.0 | 21′12″ |
| 0.45 ml., .5 N HCl | 6.0 | 14′36″ |
| 0.10 ml., .5 N HCl | 7.0 | 8′46″ |
| 0.04 ml., .5 N HCl | 8.0 | 3′55″ |
| 0.05 ml., .5 N NaOH | 9.0 | 1′40″ |
| 0.40 ml., .5 N NaOH | 10.0 | 6′34″ |
| 0.70 ml., .5 N HaOH | 11.0 | 3′16″ |

It is apparent from the above data that the flocculating activity of the fermentation broth was relatively poor when heat treated at pH values of 4 or below. At higher pH values such as 5 or above and especially 8 or above, much better results were obtained. Optimum flocculating activity was observed when the fermentation broth was heat treated at a pH value of about 9.

The above procedure could also be used to illustrate the relationship between the pH during the heating step and the flocculating activity after heating for fermentation broth prepared in accordance with Example II when using the microorganism *Cryptococcus laurentii* variety *flavescens* or *Hansenula capsulata*. A marked increase in flocculating activity may be observed at preferred pH levels.

What is claimed is:

1. A process for enhancing the flocculating activity of a microbial polysaccharide flocculant synthesized by cultivating in an aqueous fermentation medium therefor at least one microorganism selected from the consisting of *Cryptococcus laurentii* variety *flavescens, Hansenula capsulata, Hansenula holstii, Plectania occidentalis* and *Pseudomonas methanica* comprising heating an aqueous solution of the polysaccharide flocculant having a pH value of at least 5 at a temperature of about 50–100° C. until the flocculating activity is enhanced.

2. The process of claim 1 wherein the polysaccharide is synthesized by cultivating the microorganism *Cryptococcus laurentii* variety *flavescens*.

3. The process of claim 1 wherein the polysaccharide is synthesized by cultivating the microorganism *Hansenula capsulata*.

4. The process of claim 1 wherein the polysaccharide is synthesized by cultivating the microorganism *Hansenula holstii*.

5. The process of claim 1 wherein the polysaccharide is synthesized by cultivating the microorganism *Plectania occidentalis*.

6. The process of claim 1 wherein the polysaccharide is synthesized by cultivating the microorganism *Pseudomonas methanical*.

7. The process of claim 1 wherein the pH value of the aqueous solution is at least 8 and the aqueous solution is heated for about 5–120 minutes.

8. The process of claim 1 wherein the pH value of the aqueous solution is about 8–10 and the aqueous solution is heated for about 5–30 minutes.

9. A process for preparing a flocculating agent comprising cultivating at least one microorganism selected from the group consisting of *Cryptococcus laurentii* variety *flavescens, Hansenula capsulata, Hansenula holstii, Plectania occidentalis* and *Pseudomonas methanica* in an aqueous fermentation medium therefor, the microorganism being capable of synthesizing a polysaccharide having activity as a flocculant for finely divided solids suspended in an aqueous medium when cultivated in the said fermentation medium and being cultivated therein until the polysaccharide flocculant is produced, and heating the resulting fermentation medium at a pH value of at least 5 and a temperature of about 50–100° C. until the flocculating activity of the polysaccharide is enhanced.

10. The process of claim 9 wherein the polysaccharide is synthesized by cultivating the microorganism *Cryptococcus laurentii* variety *flavescens*.

11. The process of claim 9 wherein the polysaccharide is synthesized by cultivating the microorganism *Hansenula capsulata*.

12. The process of claim 9 wherein the polysaccharide is synthesized by cultivating the microorganism *Hansenula holstii*.

13. The process of claim 9 wherein the polysaccharide is synthesized by cultivating the microorganism *Plectania occidentalis*.

14. The process of claim 9 wherein the polysaccharide is synthesized by cultivating the microorganism *Pseudomonas methanica*.

15. The process of claim 9 wherein the fermentation medium is heated for about 5–120 minutes at a pH value of at least 8.

16. The process of claim 9 wherein the fermentation medium is heated for about 5–30 minutes at a pH value of about 8–10.

References Cited
UNITED STATES PATENTS

| | | | |
|---|---|---|---|
| 3,119,812 | 1/1964 | Rogovin et al. | 260—209 |
| 3,228,855 | 1/1966 | Cadmus et al. | 195—31 |

ALVIN E. TANENHOLTZ, *Primary Examiner.*

UNITED STATES PATENT OFFICE
CERTIFICATE OF CORRECTION

Patent No. 3,346,463                October 10, 1967

Mayer B. Goren

It is hereby certified that error appears in the above numbered patent requiring correction and that the said Letters Patent should read as corrected below.

Column 2, line 30, for "me" read -- be --; column 3, line 54, for "were" read -- where --; column 7, line 75, for "flucculating" read -- flocculating --; column 9, line 1, before "consisting" insert -- group --; line 22, for "methanical" read -- methanica --.

Signed and sealed this 14th day of January 1969.

(SEAL)
Attest:

Edward M. Fletcher, Jr.
Attesting Officer

EDWARD J. BRENNER
Commissioner of Patents